United States Patent Office 3,796,723
Patented Mar. 12, 1974

3,796,723
CYCLODOPA DERIVATIVES
Ado Kaiser, Neu-Frenkendorf, Wolfgang Koch, Riehen, Marcel Scheer, Basel, and Uwe Wolcke, Bottmingen, Switzerland, assignors to Hoffmann-La Roche Inc., Nutley, N.J.
No Drawing. Filed Oct. 20, 1971, Ser. No. 191,089
Int. Cl. C07d 27/38
U.S. Cl. 260—326.11                 7 Claims

ABSTRACT OF THE DISCLOSURE

N-carbonyl, thio or sulfonyl substituted cyclodopa derivatives which are useful as hypotensive, anti-pyretic and anti-parkinson agents, and a method of preparing these cyclodopa derivatives including intermediates.

SUMMARY OF THE INVENTION

In accordance with this invention, it has been discovered that compounds of the formula:

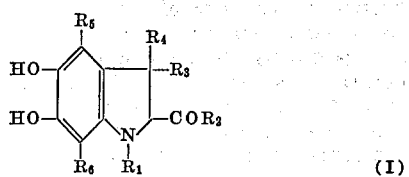

(I)

wherein $R_1$ is an aliphatic containing substituent wherein the aliphatic portion contains from 1 to 18 carbon atoms selected from the group consisting of alkoxycarbonyl, phenylalkoxycarbonyl,

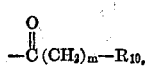

aminocarbonyl, alkylaminocarbonyl, dialkylaminocarbonyl, phenylthio, and nitrophenylthio; $R_2$ is hydroxy, amino or a substituent containing from 1 to 18 carbon atoms selected from the group consisting of alkoxy, alkylamino or dialkylamino; $R_3$ and $R_4$ individually are hydrogen or alkyl containing from 1 to 18 carbon atoms or taken together form an alkylene bridge containing from 1 to 18 carbon atoms; $R_5$ and $R_6$ are hydrogen, halogen or a substituent containing from 1 to 18 carbon atoms selected from the group consisting of alkyl and alkoxy; $R_{10}$ is alkenyl, alkynyl,

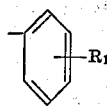

or alkoxy; $R_{11}$ is alkyl or

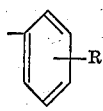

$R_{15}$ is hydrogen, alkyl, alkoxy or halogen; and $m$ is an integer from 0 to 16;

or pharmaceutically acceptable salts thereof are useful as hypotensive, anti-pyretic and anti-parkinson agents.

In accordance with this invention, the compound of Formula I or pharmaceutically acceptable salts thereof is prepared by subjecting a boric acid complex of the formula:

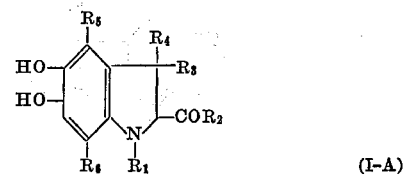

(I-A)

wherein $R_1$, $R_2$, $R_3$, $R_4$, $R_5$ and $R_6$ are as above; and the two phenolic hydroxy groups are esterified with boric acid;

or pharmaceutically acceptable salts thereof to acid hydrolysis.

On the other hand, a compound of Formula I above or pharmaceutically acceptable salts thereof can be prepared by esterifying or amidating an acid of the formula:

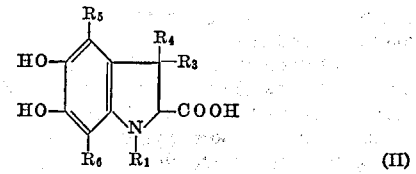

(II)

wherein $R_1$, $R_3$, $R_4$, $R_5$ and $R_6$ are as above;

or pharmaceutically acceptable salts thereof.

On the other hand, the compound of Formula I can be prepared by subjecting a compound of the formula:

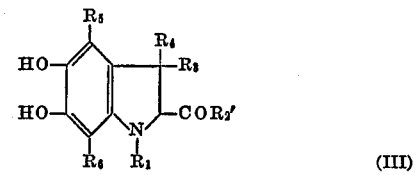

(III)

wherein $R_1$, $R_3$, $R_4$, $R_5$ and $R_6$ are as above; and $R_2'$ is a primary or secondary alkoxy group;

or pharmaceutically acceptable salts thereof to mild basic hydrolysis or to treatment with ammonia or a dialkylamine.

On the other hand, a compound of the Formula I or pharmaceutically acceptable salts thereof can be prepared by subjecting a compound of the formula:

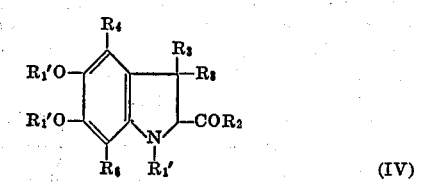

(IV)

wherein $R_2$, $R_3$, $R_4$, $R_5$ and $R_6$ are as above; $R_1'$ is an aliphatic containing substituent wherein the aliphatic portion contains from 1 to 18 carbon atoms selected from the group consisting of

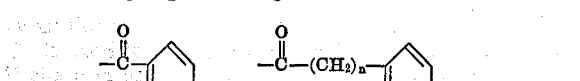

alkoxyalkanoyl, alkenoyl and alkynoyl; $n$ and $R_{15}$ is as above;

or pharmaceutically acceptable salts thereof to mild basic hydrolysis.

On the other hand, the compound of Formula I and pharmaceutically acceptable salts thereof can be prepared by reacting in an aqueous medium at a pH of about 10, a compound of the formula:

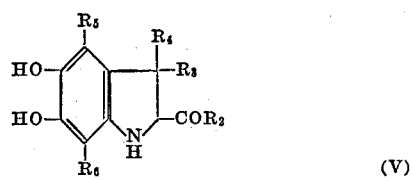

(V)

wherein $R_2$, $R_3$, $R_4$, $R_5$ and $R_6$ are as above; or a pharmaceutically acceptable salt thereof with a compound of the formula:

$$X—R_1' \qquad (XV)$$

wherein $R_1'$ is as above; and X is a reactive functional derivative of an organic acid.

The preferred indoline derivatives of Formula I or Formula V provided by the invention are those which exist in L- or D,L- form.

The aforementioned aliphatic groups can be straight chain or branched chain. The alkyl groups preferably contain from 1 to 7 carbon atoms such as, for example, methyl, isopropyl, n-hexyl or n-heptyl. The alkoxy groups also preferably contain from 1 to 7 carbon atoms such as, for example, methoxy, isopropyl, n-hexyloxy or n-heptyloxy. A halogen atom can be a fluorine, chlorine, bromine or iodine atom, with fluorine, chlorine and bromine being preferred. The alkenoyl groups mentioned earlier preferably contain from 3 to 8 carbon atoms such as, for example, acrylylcrotonyl, β-methylcrotonyl or 2,4-pentadienoyl. The alkynoyl groups preferably contain from 3 to 8 carbon atoms such as, for example, propioloyl or methylpropioloyl. The alkoxycarbonyl groups preferably contain from 2 to 8 carbon atoms such as, for example, methoxycarbonyl, ethoxycarbonyl or t-butoxycarbonyl. A substituted-alkanoyl group denoted by $R_1$ contains at least 2 carbon atoms and preferably up to 8 carbon atoms in the alkanoyl group; for example, ethoxyacetyl, β-methoxypropionyl, p-tolylacetyl or β-(o-chlorophenyl)-propionyl. Examples of other substituted groups denoted by $R_1$ are (o-nitrophenyl)-thio, (p-nitrophenyl)-thio, p-toluenesulfonyl, dimethylaminocarbonyl, p-chlorobenzoyl and benzyloxycarbonyl.

The compounds of Formula I above form pharmaceutically acceptable salts with bases. Any conventional pharmaceutically aceptable base can be utilized to form a salt in accordance with this invention. Among these salts are included dialkali metal salts such as the disodium or dipotassium salts or diammonium salts.

A preferred group of indoline derivatives provided by the present invention comprises those compounds of Formula I in which $R_2$ is a hydroxy group, $R_3$ is hydrogen or methyl, especially hydrogen, and $R_4$, $R_5$, and $R_6$ each are hydrogen.

Interesting compounds of Formula I above are N-benzyloxycarbonyl-L-cyclodopa (N-benzyloxycarbonyl-L-5,6-dihydroxy-indoline-2-carboxylic acid) and N-phenacetyl-L-cyclodopa.

The boric acid complex of Formula I-A or a salt thereof, is prepared via the indoline compound of Formula V above or a salt thereof. The compound of the Formula V or salt thereof is prepared from a phenylalanine derivative of the formula:

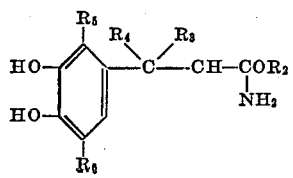

(VI)

wherein $R_2$, $R_3$, $R_4$, $R_5$ and $R_6$ are as above; or pharmaceutically acceptable salts thereof via an intermediate of the formula:

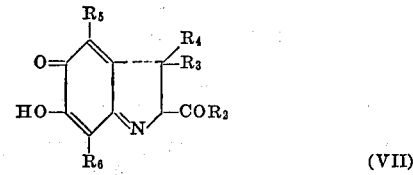

(VII)

wherein $R_2$, $R_3$, $R_4$, $R_5$ and $R_6$ are as above; or pharmaceutically acceptable salts thereof.

The compound of Formula VI or salt thereof is converted to a compound of Formula VII above or salt thereof by treating the compound of Formula VI above or a salt thereof with an oxidizing agent. Any of the conventional oxidizing agents such as potassium hexacyanoferrate (III), silver oxide, or manganese dioxide at a temperature between about −30° C. to +50° C. and at a pH of about 3 to 9. Generally, this reaction is carried out in an aqueous medium.

The compound of Formula VII or salt thereof is converted to the compound of Formula V or salt thereof by treating the compound of Formula VII or salt thereof with an inorganic reducing agent such as an alkali metal dithionite, preferably sodium dithionite. Generally, this reaction is carried out in situ in the same reaction medium in which the compound of Formula VII or a salt thereof was formed. The same conditions utilized for forming the compound of the Formula VI or a salt thereof can be utilized to convert the compound of the Formula VII or salt thereof to the compound of the Formula V or salt thereof.

The compound of Formula V can then be converted to a boric acid complex of the formula:

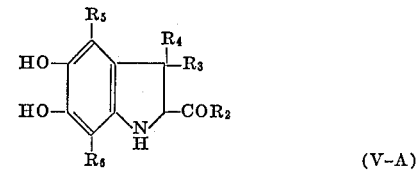

(V-A)

wherein $R_2$, $R_3$, $R_4$, $R_5$ and $R_6$ are as above; and the two hydroxy groups are esterified with boric acid; or a salt thereof.

The formation of the boric acid complex of Formula V-A or salt thereof is carried out by treating the compound of Formula V with boric acid or a borate salt while maintaining a pH value of at least about 7. Borax is preferably used, although other salts of boric acid such as, for example, the alkali metal metaborates (e.g., sodium metaborate) and the alkali metal pentaborates (e.g., potassium pentaborate) can also be used. Water is preferably used as the solvent, although mixtures of water with an inert organic solvent such as, for example, tetrahydrofuran, dioxan, dimethyl sulfoxide or dimethylformamide can also be used. The treatment is preferably carried out at a temperature between about 0° C. and about 70° C. The treatment is preferably carried out while maintaining the pH value of the aqueous medium at between about 7 and 13. This can be achieved by the addition of inorganic base such as an alkali metal hydroxide or an organic base such as organic amine bases. Among the preferred alkali metal hydroxides are included sodium hydroxide, potassium hydroxide. Among the organic amine bases are included triethylamine, pyridine, etc.

The treatment of the compound of Formula V or a salt thereof with boric acid or with a borate salt in the manner described above yields the boric acid complex of the Formula V-A or salt thereof, wherein the two phenolic hydroxy groups are esterified with boric acid. This boric acid complex is subsequently reacted with an acylating agent of the formula $R_1X$ to furnish the acid group $R_1$ to yield the boric acid complex of the Formula I-A or a salt thereof.

In carrying out the acylation reaction, any of the conditions conventional in acylation can be utilized. The compounds of the formula $R_1X$ are conventional acylating agents. In the compounds of the formula $R_1X$, X can be any conventional reactive functional derivative of an acid such as a halide, azide or anhydride.

This reaction can be carried out in an aqueous medium. However, organic solvents can be utilized. Generally, it is preferred to carry out this reaction in an aqueous medium or in a mixture of water with an inert organic solvent. Any conventional inert organic solvent can be utilized. Among the preferred solvents are included tetrahydrofuran, dioxan, dimethyl sulfoxide, dimethylformamide, etc. This reaction is generally carried out at a temperature of from 0° C. to about 70° C. and at a pH of above 7, preferably from 7 to 13.

Generally, the formation of the complex of Formula I-A is carried out by the addition of the compound of formula $R_1X$ to the reaction medium where the complex of Formula V-A was formed. The reaction medium, temperature and pH for the acylation are preferably the same as for the preparation of the boric acid complex of a compound of Formula V-A.

The preparation of the boric acid complex of Formula I-A or of a salt thereof used as the starting material in the present process is preferably carried out in situ starting from a compound of Formula V. The boric acid complex of the Formula V-A or salt thereof which is obtained is preferably employed directly in solution (i.e., without isolation) in the process in accordance with the invention.

The acidic hydrolysis of a boric acid complex of the Formula I-A or of a salt thereof in accordance with the present invention is preferably carried out in solution. Preferably, a basic aqueous solution prepared in the manner described earlier is adjusted to a pH of about 1 to about 4 with an acid. The boric acid complex is thereby cleaved and the desired compound of Formula I is obtained. As acid agents there are preferably used mineral acids such as sulfuric acid, hydrochloric acid, phosphoric acid, etc., although organic acids such as mono- or polybasic alkanecarboxylic acids (e.g., formic acid, acetic acid, trichloroacetic acid, citric acid, tartaric acid and oxalic acid) can also be used. The acidic hydrolysis can be carried out using the same solvents and at the same temperatures as in the preparation of the boric acid complex of a compound of Formula V-A described earlier. Care should be taken not to prolong the acid treatment and elevated temperatures so as not to hydrolyze the compound of Formula I-A.

The acidic hydrolysis of a boric acid complex of a compound of Formula I-A yields in a particularly simple manner a selectively N-acylated compound of Formula I which is unsubstituted at the phenolic hydroxy groups. By providing a boric acid complex of the Formula I-A, the phenolic hydroxy groups present in the boric acid complex are protected against attack by the acylating agent as well as by oxidation by atmospheric oxygen.

In accordance with another embodiment of this invention, the acid of Formula II is esterified; for example, by reaction with a corresponding diazo compound (e.g., diazomethane, diazoethane, etc.). This reaction is preferably carried out in the presence of an inert organic solvent such as diethyl ether, tetrahydrofuran, dioxan, dimethylformamide, methylene chloride or ethyl acetate and at a temperature between about 0° C. and the boiling point of the reaction mixture. According to a further method for the esterification of an acid of Formula II the acid can be treated with a base, especially with a substituted organic base such as triethylamine or dicyclohexylamine. The salt obtained can subsequently be reacted with a compound of the formula $R_7Z$ or $(R_7)_2SO_4$ wherein $R_7$ is alkyl, and Z is a leaving group. Z can be any conventional leaving group. Among the preferred leaving groups are included halogens, especially a chlorine, bromine or iodine or a substituted-sulfonyloxy group such as a methanesulfonyloxy, benzenesulfonyloxy, p-toluenesulfonyloxy or p-bromobenzenesulfonyloxy group. This reaction is preferably carried out in the presence of an inert organic solvent, for example, in dimethylformamide, dimethyl sulfoxide or tetrahydrofuran. This reaction is expediently carried out at a temperature between about 0° C. and the boiling point of the reaction mixture. This reaction produces a compound of Formula I where $R_2$ is alkoxy.

Where $R_1$ in the compound of Formula I is

alkenoyl, alkynoyl,

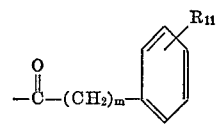

or alkoxyalkanoyl, this compound can be formed by reacting a compound of Formula II with an alcohol furnishing the group $R_2$. Any conventional method of reacting an organic acid with an alcohol to form an ester can be utilized. Generally, this reaction is carried out in the presence of an acidic catalyst such as hydrochloric acid, sulfuric acid, p-toluenesulfonic acid or thionyl chloride. A large excess of the alcohol is preferably used so that it simultaneously serves as the solvent. The temperature is not critical. Generally, this reaction is preferably carried out at between about 0° C. and the boiling point of the reaction mixture.

The amidation of an acid of Formula II in accordance with yet another embodiment of the present process can be carried out, for example, by treating an acid of Formula II with an inorganic acid halide (e.g., thionyl chloride) and then reacting the derivative obtained with ammonia or an alkyl or dialkylamine. It is preferred to carry out this amidation in an inert organic solvent such as tetrahydrofuran, chloroform or dimethylformamide. If desired, a tertiary organic base such as pyridine or triethylamine can be added to the reaction. The temperature at which this reaction is carried out preferably lies between about 0° C. and the boiling point of the reaction mixture. The amidation can also be carried out by reacting an acid of Formula II directly with ammonia or the appropriate amine in the presence of a dehydrating agent such as dicyclohexylcarbodiimide, carbonyldiimidazole or ethoxyacetylene. This reaction is likewise preferably carried out in an inert organic solvent such as tetrahydrofuran, chloroform or dimethylformamide. This reaction is preferably carried out at a temperature between about 0° C. and the boiling point of the reaction mixture.

The mild basic hydrolysis of an ester of Formula III in accordance with still another embodiment of the present process to yield a corresponding acid of Formula I, is preferably carried out by treating an aqueous or loweralkanoic solution of an ester of Formula III, if desired in admixture with an inert organic solvent such as tetrahydrofuran or dioxan, with a dilute inorganic base (e.g., sodium hydroxide, potassium hydroxide or ammonia) or with a quaternary ammonium hydroxide (e.g., tetramethyl ammonium hydroxide). The mild basic conditions for the hydrolysis are achieved by using the inorganic base or the quaternary ammonium hydroxide in not more than about a 50% molar excess and by carrying out the hydrolysis at a temperature between about 0° C. and 50° C. Non-quaternary organic bases such as aqueous triethylamine or aqueous pyridine can also be used, in which case they can be employed in a large excess.

The treatment of an ester of Formula III with ammonia or an alkyl or dialkylamine in accordance with a further embodiment of the present process to yield a corresponding amide of Formula I can be carried out, for example, in an inert solvent such as water or a lower alkanol, tetrahydrofuran, dioxan or dimethyl sulfoxide. If desired, the treatment can be carried out using a large excess of ammonia or the amine. In this manner, ammonia or the amine can simultaneously serve as the solvent. The treatment is preferably carried out at a temperature of from about $-40°$ C. to $+100°$ C. When ammonia or a volatile amine is used, it is expedient to carry out the treatment in a closed system; for example, at up to 50 atmospheres (gauge).

The starting materials of Formula IV above are prepared by introducing three $R_1'$ groups into a compound of Formula V. This can be carried out, for example, by reacting a compound of Formula V with an excess of a compound of the Formula XV in the presence of aqueous sodium hydroxide at a pH of about 7 to 8.5 or in the presence of pyridine in an inert solvent. The reaction is preferably carried out with exclusion of oxygen in an inert gas such as argon. In a preferred embodiment of this invention, Z in the compound of Formula XV, is an acid halide (particularly the chloride), an acid anhydride or azide.

The hydrolysis of a compound of Formula IV in accordance with yet a further embodiment of the present process is preferably carried out using a dilute inorganic base such as sodium hydroxide or potassium hydroxide or with the aid of a quaternary ammonium hydroxide such as tetramethylammonium hydroxide. The hydrolysis is preferably carried out in an aqueous medium or in an inert organic solvent such as a lower alkanol, tetrahydrofuran or dioxan, or in a mixture of these solvents with water. Mild basic conditions are maintained during the hydrolysis so that the acid group $R_1'$ attached to the nitrogen atom is not cleaved off. The mild hydrolysis conditions are achieved by carrying out the hydrolysis at a temperature which is preferably held between about $0°$ C. and $50°$ C. and by using not more than about a 50% molar excess of the inorganic base or of the quaternary ammonium hydroxide. The hydrolysis can also be carried out with the aid of a non-quaternary organic base such as triethylamine, dicyclohexylamine or pyridine in the presence of water, in which case large excesses can be used without running the risk of the acid group $R_1'$ attached to the nitrogen atom being cleaved off to a substantial extent. Where an ester of Formula IV is used as the starting material, an acid of Formula I is obtained. Where, on the other hand, an amide of Formula IV is used, the amide group is retained in the resulting compound of Formula I.

The reaction of a compound of Formula V with the compound of Formula XV in accordance with a still further embodiment of the present process can be carried out, for example, in the presence of an aqueous base such as a caustic alkali (e.g., sodium hydroxide or potassium hydroxide) at a pH above about 10 using a corresponding acid halide, preferably the chloride, acid azide or acid anhydride at a temperature between $0°$ C. and $70°$ C. This reaction is preferably carried out in inert gas atmosphere with the exclusion of oxygen. Where the group $-COR_2$ in a compound of Formula V represents an ester group, this is converted into the carboxy group during the reaction.

The compounds of Formula I hereinbefore contain an acid group $R_1$ which can be cleaved off under strongly acidic conditions, especially at high temperatures. This acid-sensitivity is particularly true in the case of alkoxycarbonyl groups such as the t-butoxyrarbonyl group and in the case of phenylthio groups such as the phenylthio group and the (o-nitrophenyl)-thio group. In the working up of the products of the present process, care should therefore be taken, with respect to the acid groups $R_1$, that the product is not strongly acidified or strongly acidified and heated, since under strongly acidic conditions, particularly in conjunction with elevated temperatures, there exists the risk that the group $R_1$ will be wholly or partially cleaved off with consequential reduction in yield.

Racemates of Formula I can be resolved; for example, by subjecting an acid of Formula I to fractional crystallization with an optically active base such as quinine, brucine, dehydroabietylamine, $(+)$- or $(-)$-ephedrine or $(+)$- or $(-)$-$\alpha$-methylbenzylamine. The optically active forms can, however, also be obtained by using pure optically active starting materials.

The compounds of Formula I (the D,L-, D- and, especially, the L-form) and their salts and pharmacodynamically active. They are characterized by numerous actions on the nervous system. In particular, they possess hypotensive, antipyretic and antiparkinson properties.

The compounds of Formula I and their salts can accordingly be used in the form of pharmaceutical preparations which contain the compound of Formula I in association with a compatible pharmaceutical carrier. This carrier can be an organic or inorganic inert carrier material which is suitable for enteral or parenteral administration such as, for example, water, gelatin, gum arabic, lactose, starches, magnesium stearate, talc, vegetable oils, polyalkylene glycols, petroleum jelly, etc. The pharmaceutical preparations can be made up in solid form (e.g., as tablets, dragees, suppositories or capsules) or in liquid form (e.g., as solutions, suspensions or emulsions). The pharmaceutical preparations may be sterilized and/or may contain adjuvants such as preserving, stabilizing, wetting or emulsifying agents, salts for varying the osmotic pressure or buffers. They can also contain other therapeutically valuable substances.

A pharmaceutical preparation in dosage unit form can expediently contain about 10 to about 1000 mg. of active ingredient.

The amount of active ingredient to be administered per day is governed by the particular case. In the case of oral administration, in general an amount of active ingredient of about 0.1 to about 4 g., especially about 1.5 to about 3 g. will be administered. In the case of intravenous administration, the amount of active ingredient to be administered per day can be between about 10 mg. and about 2 g., especially about 1 g.

The administration is expediently effected in individual doses divided over the day.

Furthermore, the compounds of Formula I hereinbefore are suitable as intermediates for the manufacture of pure indoline compounds of Formula V hereinbefore. The latter are sensitive to atmospheric oxygen and, moreover, in the direct synthesis thereof (oxidation of compounds of Formula VI and reduction of the compounds of Formula VII obtained) they are obtained in admixture with large amounts of inorganic material. It is practically impossible to separate the compounds of Formula V from the impurities in a conventional manner and without significant losses.

However, the compounds of Formula V can be converted in their crude state in the manner described earlier into the compounds of Formula I which are substantially more stable to atmospheric oxygen and which can be readily isolated from the impurities arising in the process without significant losses by the usual methods; for example, by extraction with an organic solvent. The pure compounds of Formula I thus obtained can be converted with the minimum of loss into the compounds of Formula V which likewise represent valuable compounds which are useful as hypotensive, anti-parkinson and anti-pyretic agents.

The process for the conversion of a compound of Formula I into a compound of Formula V comprises amount of ethanol, there firstly precipitating oily impurities. There is obtained N-benzyloxycarbonyl-L-cyclodopa of melting point 211°–213° C. (decomposition); $[\alpha]_D^{25} = -66.8°$ (c.=0.5 percent; methanol).

The solution described hereinbefore contains, after the addition of borax, the boric acid complex of L-cyclodopa and, after the addition of carbobenzoxy chloride, the boric acid complex of N-benzyloxycarbonyl-L-cyclodopa.

EXAMPLE 2

Solution 1

82 g. of potassium hexacyanoferrate (III) are dissolved in 200 ml. of water.

Solution 2

20.8 g. of sodium bicarbonate are dissolved in 400 ml. of water under argon on a steam-bath. Into this solution there are introduced 9.32 g. of finely powdered L-dopa, which is also brought into solution under argon on a steam bath. The solution is then cooled to room temperature.

Solution 3

Simultaneously with the preparation of solution 2, 80 g. of sodium becarbonate are dissolved in 600 ml. of water on a steam-bath and the solution is then cooled to room temperature. 56 g. of sodium dithionite monohydrate are introduced into the solution obtained. There is then immediately introduced into solution 2, with vigorous stirring, firstly solution 1 and, after 30 seconds, as rapidly as possible, solution 3. After 10 seconds, the mixture is treated with 280 ml. of concentrated aqueous hydrochloic acid and subsequently evaporated under reduced pressure at a bath-temperature of 40° C. After the addition of a small amount of toluene, the evaporation procedure is repeated. The residues from four of the batches described heerinbefore are each dissolved in a solution of 34 g. of borax in 50 ml. of water at 10° C. under argon. After the addition of 480 ml. of dioxan, the solution is adjusted to pH 9 with an aqueous solution containing 28 percent by weight sodium hydroxide and alternately treated dropwise within 2 hours at an internal temperature of 10°–15° C. with 26.4 ml. of phenyl-acetyl chloride and an aqueous solution containing 28 percent by weight sodium hydroxide in such a way that the pH remains between 8.9 and 9.2. The mixture is stirred for 2 hours, then digested with 800 ml. of ethyl acetate and filtered off under suction. The residue is rinsed with a small amount of water and ethyl acetate. The organic phase is discarded. The aqueous phase is adjusted to pH 1 with 5 N aqueous hydrochloric acid and extracted three times with a total of 6 liters of ethyl acetate. The extract is washed with a saturated aqueous sodium chloride solution, dried over sodium sulphate/animal charcoal and, after the addition of a small amount of toluene, evaporated. The residue N-phenacetyl-L-cyclodopa is a dark oil.

For characterization, the compound is converted into the O,O-diacyl derivative as described hereinafter:

25.6 g. of crude N-phenacetyl-L-cyclodopa are mixed under argon with 600 ml. of water and 60 ml. of 2 N sodium hydroxide. The mixture is adjusted to pH 7 by addition of acetic anhydride and alternately treated dropwise within 2 hours at an internal temperature of 0°–3° C. with 60.8 ml. of acetic anhydride and 2 N aqueous sodium hydroxide in such a manner that the pH remains between 6.5 and 7.5. The mixture is stirred for 2 hours, then adjusted to pH 1 with 6 N aqueous sulphuric acid and exhaustively extracted with a total of 3 liters of ethyl acetate. The extract is washed with a saturated aqueous sodium chloride solution, dried over sodium sulphate/animal charcoal and, after the addition of a small amount of toluene, evaporated under reduced pressure. The residue is dissolved in boiling ethyl acetate. The solution is decolorized with charcoal. The filtrate is concentrated and treated with isopropyl ether up to incipient crystallization. The O,O-diacetyl-N-phenacetyl-L-cyclodopa which is obtained melts at 221°–222° C. $[\alpha]_D^{25} = -8.4°$ (C.=0.5 percent, tetrahydrofuran).

EXAMPLE 3

The crude L-cyclodopa which is obtained from 9.3 g. of L-dopa as described in Example 1 is added to a mixture of 600 ml. of water, 120 ml. of dioxan and 34 g. of borax, which has been gassed with argon and cooled to 10° C. The mixture is adjusted to pH 9 with an aqueous solution containing 28 percent by weight sodium hydroxide. 6.5 ml. of 2-chlorobenzoyl chloride and 2 N aqueous sodium hydroxide are then alternately added dropwise in such a way that the pH of the mixture remains between 8.9 and 9.2. The mixture is then stirred for a further 1 hour and subsequently filtered. The filtrate is washed once with 600 ml. of ethyl acetate, the aqueous phase is acidified to pH 1 with 5 N aqueous hydrochloric acid, saturated with sodium chloride and extracted three times with 800 ml. of ethyl acetate each time. After drying over sodium sulphate/animal charcoal, the filtrate is evaporated under reduced pressure. The evaporation residue is chromatographed on 800 g. of Kieselgel with ethyl acetate/glacial acetic acid to yield N-(2-chlorobenzoyl)-L-cyclodopa as a colorless glass; $[\alpha]_D^{25} = -153.5°$ (c.=1 percent, glacial acetic acid).

EXAMPLE 4

Tablets of the following composition are prepared:

|  | Mg. |
|---|---|
| N-benzyloxycarbonyl-L-cyclodopa | 100 |
| Lactose | 61 |
| Corn starch | 30 |
| Polyvinylpyrrolidone | 4 |
| Talcum | 5 |

The active ingredient is mixed with the lactose and the corn starch and, after the addition of a solution of polyvinylpyrrolidone in 40 ml. of ethanol, granulated. The granulate is dried at 30° C., mixed with talcum and compressed to tablets.

|  | Mg. |
|---|---|
| Individual weight of one tablet | 200 |
| Active ingredient content of one tablet | 100 |

EXAMPLE 5

Gelatin capsules containing the following ingredients are prepared:

|  | Mg. |
|---|---|
| N-(phenacetyl)-L-cyclodopa | 50 |
| Mannitol | 98.5 |
| Stearic acid | 1.5 |

The ingredients are homogeneously mixed and filled into gelatin capsules No. 2 via a capsule-filling machine.

|  | Mg. |
|---|---|
| Individual weight of one capsule | 150 |
| Active ingredient content of one capsule | 50 |

We claim:
1. A compound of the formula

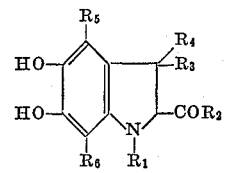

wherein $R_1$ is selected from a 1 to 18 carbon atom containing substituent group consisting of $C_{1-7}$ alkoxy carbonyl optionally substituted with phenyl and

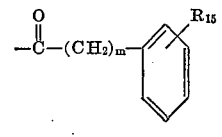

cleaving off the acid group $R_1'''$ from a compound of the general formula:

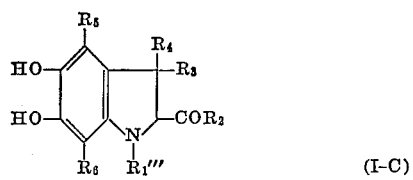

(I-C)

wherein $R_2$, $R_3$, $R_4$, $R_5$ and $R_6$ are as above; and $R_1'''$ is benzyloxycarbonyl, lower t-alkoxycarbonyl or nitrophenylthio, by acid hydrolysis.

On the other hand, where $R_1'''$ is benzyloxycarbonyl, the compound of Formula I–C can also be converted to the compound of Formula V by reduction or treatment with hydrogen bromide or trifluoroacetic acid.

Generally, when $R_1'''$ is nitrophenylthio or t-alkoxycarbonyl, the compound of Formula I–C can be converted to the compound of Formula V by treatment with an acid.

The acid group $R_1'''$ in the compound of Formula I–C can be cleaved off hydrolytically. Any conventional method of acid hydrolysis can be utilized to convert the compound of the Formula I–C to the compound of the Formula V.

For the acid hydrolysis there is preferably used an aqueous mineral acid such as hydrochloric acid or sulfuric acid or toluenesulfonic acid, if desired in admixture with an inert organic solvent such as a lower alkanol, glacial acetic acid or dioxan. The hydrolysis is preferably carried out at a temperature between about 0° C. and the boiling point of the mixture. In so doing, an ester group or aminocarbonyl group which may be present is converted into the carboxy group. Therefore, this method produces a compound of Formula V where $R_2$ is hydroxy.

A benzyloxycarbonyl group $R_1'''$ attached to the nitrogen atom can be cleaved off by reduction. This cleavage can be carried out by treatment with catalytically activated hydrogen. As catalyst there can be used, for example, palladium, Raney-nickel, platinum or ruthenium. It is preferred to carry out this catalytic hydrogenation in an inert solvent; for example, water, a lower alkanol such as methanol or ethanol, an organic acid such as acetic acid, dimethylforamide, tetrahydrofuran or dimethyl sulfoxide. The catalytic hydrogenation can expediently be carried out at a temperature between about 0° C. and 80° C.

A benzyloxycarbonyl group $R_1'''$ can also be cleaved off by treatment with hydrogen bromide, if desired in an iert organic solvent such as glacial acetic acid, nitromethane, chloroform, ethyl acetate or ether, or by treatment with trifluoroacetic acid, if desired with the addition of phenol, resorcinol or anisole. This treatment is expediently carried out at a temperature between about room temperature and the boiling point of the mixture. It is preferred to carry out the treatment at an elevated temperature.

A lower t-alkoxycarbonyl group $R_1'''$, especially the t-butoxycarbonyl group, attached to the nitrogen atom can be cleaved off by treatment with an acidic agent. This treatment is expediently carried out in an organic solvent; for example, glacial acetic acid, ethyl acetate, methylene chloride, diethyl ether or tetrahydrofuran. As acidic agents for this cleavage there are preferably used strong acids such as hydrogen chloride, p-toluenesulfonic acid or trifluoroacetic acid. The treatment is preferably carried out at a temperature of from about 0° C. to 70° C.

A nitro-substituted phenylthio group present in a compound of Formula I can be cleaved off by treatment with an acidic agent. This is effected, for example, by treating the compound in an inert organic solvent such as glacial acetic acid, diethyl ether, tetrahydrofuran or chloroform with gaseous hydrochloric acid, or by treating the compound in aqueous solution, if desired in the presence of an organic solvent such as tetrahydrofuran, dimethylformamide, dimethylsulfoxide or a lower alkanol, with a mineral acid such as, for example, hydrochloric acid or sulfuric acid at a pH between about 1 and 4 in the presence of thiophenol, thioacetamide or rhodanine. This treatment is preferably carried out at a temperature between about 0° C. and the boiling point of the mixture.

Optically active compounds of Formula I are not racemized in the conversion into the compounds of Formula V. Since the optical configuration is also retained in the conversion of compounds of Formula V into compounds of Formula I, there is provided a method for the purification of compounds of Formula V via the compounds of Formula I, according to which optical isomers of Formula I to be purified which are used can be recovered without racemization. This is of preparative advantage.

The following examples illustrate the process provided by the invention. In the examples concentrated aqueous hydrochloric acid denotes an aqueous solution containing percent by weight hydrochloric acid.

EXAMPLE 1

Solution 1

82 g. of potassium hexacyanoferrate (III) are dissolved in 200 ml. of water.

Solution 2

20.8 g. of sodium bicarbonate are dissolved in 400 ml. of water under argon on a steam-bath. To this solution there are added 9.32 g. of finely powdered L-dopa which is also dissolved under argon on a steam-bath. The solution is then cooled to room temperature.

Solution 3

Simultaneously with the preperation of solution 2, 80 g. of sodium bicarbonate are dissolved in 600 ml. of water on a steam-bath and the solution is then cooled to room temperature. 56 g. of sodium dithionite monohydrate are added to the cooled solution and the resulting solution is then used immediately in the process.

Solution 2 is placed in a sulphonating flask, which has previously been gassed with argon, and stirred vigorously. Solution 1 is first added and then, after 30 seconds, solution 3. After a further 10 seconds, 280 ml. of concentrated aqueous hydrochloric acid are run in as rapidly as possible from a dropping funnel. The mixture is then immediately evaporated at a bath-temperature of 40° C. under reduced pressure and re-evaporated after the addition of a small amount of toluene. The residue contains crude L-cyclodopa(L-5,6-dihydro-indoline-2-carboxylic acid).

Three of the batches described hereinbefore are each dissolved in a solution of 34 g. of borax in 600 ml. of water at 10° C. under argon and rinsed into the reaction vessel, which has been gassed with argon. 360 ml. of dioxan are added and the mixture is adjusted to pH 9 with an aqueous solution containing 28 percent by weight of sodium hydroxide. 25.5 g. of carbobenzoxy chloride and 2-N aqueous sodium hydroxide are then alternately added dropwise within 2 hours at an internal temperature of 10°–15° C. in such a way that the pH remains between 8.9 and 9.2. The mixture is then stirred for a further 1 hour. It is subsequently thoroughly stirred with 2 liters of ethyl acetate and filtered. The filter residue is rinsed with a small amount of water and ethyl acetate and the organic phase is separated off in the filtrate. The aqueous phase is adjusted to pH 1 with 5 N aqueous hydrochloric acid and extracted three times with a total of 6 liters of ethyl acetate. The ethyl acetate is washed with saturated sodium chloride solution, dried over sodium sulphate/animal charcoal and evaporated after the addition of a small amount of toluene. A reddish evaporation residue is obtained which can be chromatographed on Kieselgel with chloroform/methanol (1:1 parts by volume) for purification. The product which is thus pre-purified may be recrystallized from water with the addition of a small wherein $m$ is an integer from 0 to 16 and $R_{15}$ is hydrogen or halogen; $R_2$ is hydroxy and $R_3$, $R_4$, $R_5$ and $R_6$ are hydrogen
and the pharmaceutically acceptable salts thereof.

2. The compound of claim 1, wherein $R_1$ is

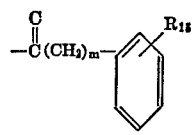

and $R_{15}$ and $m$ are as above.

3. The compound of claim 2 wherein said compound is N-phenacetyl-L-cyclodopa.

4. The compound of claim 2 wherein $m$ is 0.

5. The compound of claim 4 wherein said compound is N-(2-chlorobenzoyl)-L-cyclodopa.

6. The compound of claim 1 wherein said $R_1$ is phenylalkoxycarbonyl.

7. The compound of claim 6 wherein said compound is N-benzyloxycarbonyl-L-cyclodopa.

References Cited

Theilheimer: Synthetic Methods of Organic Chemistry, vol. 10, p. 351 (1956).

Steinberg: Organoboron Chemistry, vol. 1 (1964), pp. 221, 222, 227, 840–842.

JOSEPH A. NARCAVAGE, Primary Examiner

U.S. Cl. X.R.

424—274

UNITED STATES PATENT OFFICE
CERTIFICATE OF CORRECTION

PATENT NO. : 3,796,723
DATED : March 12, 1974
INVENTOR(S) : Kaiser, Koch, Scheer and Wolcke It is certified that error appears in the above-identified patent and that said Letters Patent are hereby corrected as shown below:

Cover page, after

"Ser. No. 191,089" insert

Foreign Application Priority Data

October 30, 1970  Switzerland  16047/70

Signed and Sealed this eleventh Day of May 1976

[SEAL]

Attest:

RUTH C. MASON
Attesting Officer

C. MARSHALL DANN
Commissioner of Patents and Trademarks